April 27, 1926. 1,582,043
N. HILBERRY
METHOD OF AND APPARATUS FOR ELECTRIC WELDING
Filed Feb. 28, 1923 2 Sheets-Sheet 1
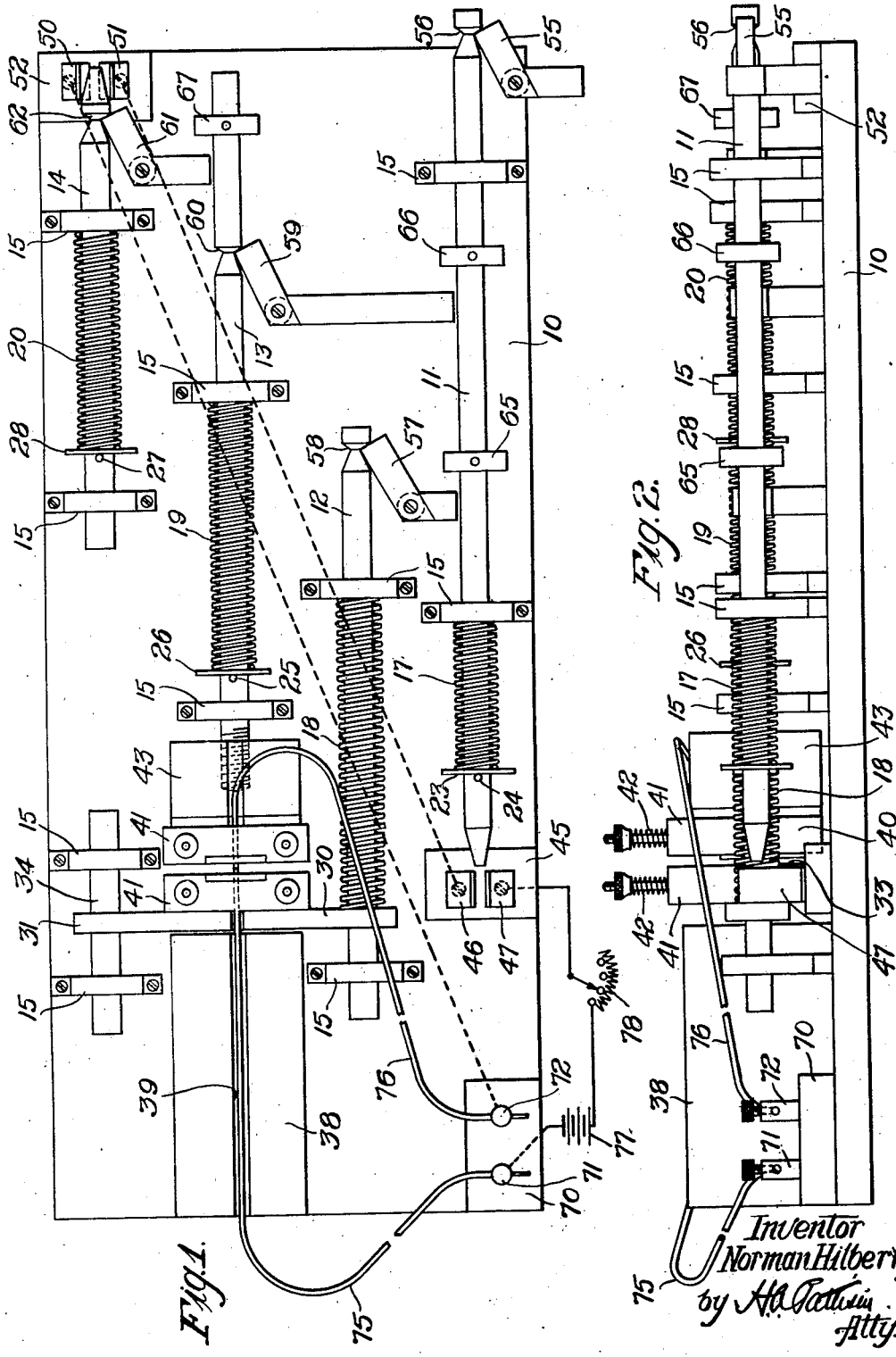

April 27, 1926.   1,582,043
N. HILBERRY
METHOD OF AND APPARATUS FOR ELECTRIC WELDING
Filed Feb. 28, 1923   2 Sheets-Sheet 2
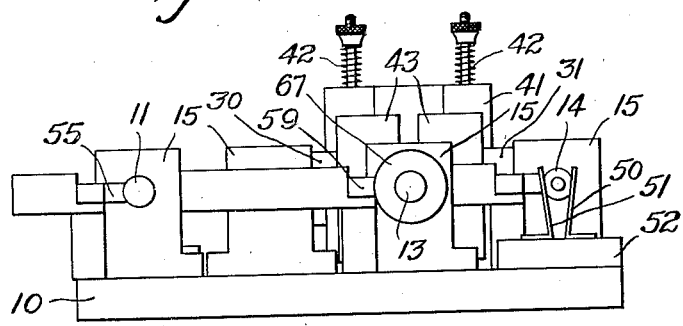
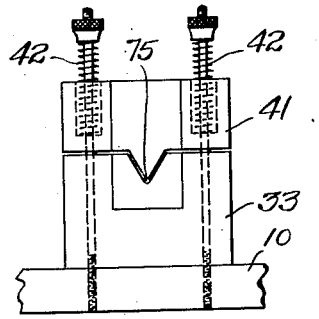
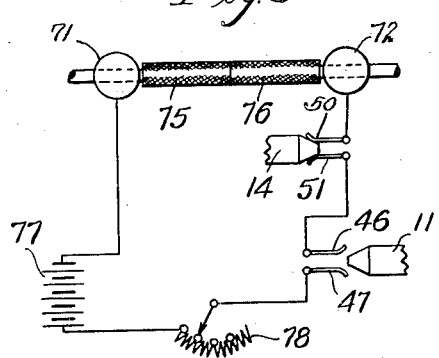
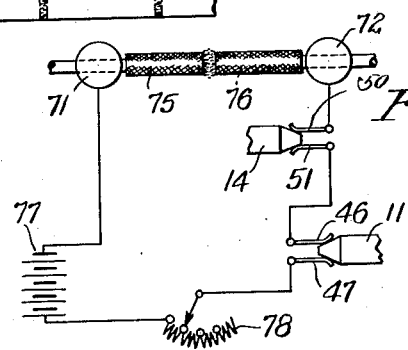
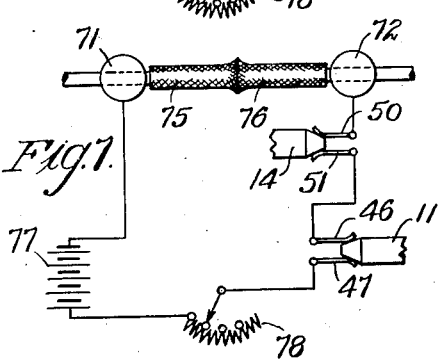
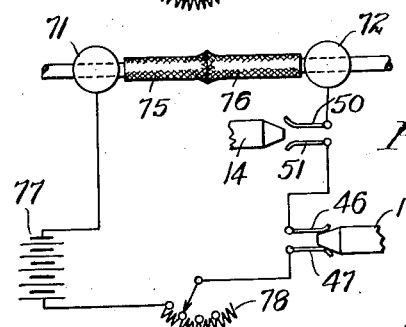
Inventor
Norman Hilberry
by H.A. Patterson
Atty.

Patented Apr. 27, 1926.

1,582,043

UNITED STATES PATENT OFFICE.

NORMAN HILBERRY, OF STEUBENVILLE, OHIO, ASSIGNOR TO WESTERN ELECTRIC COMPANY, INCORPORATED, OF NEW YORK, N. Y., A CORPORATION OF NEW YORK.

METHOD OF AND APPARATUS FOR ELECTRIC WELDING.

Application filed February 28, 1923. Serial No. 621,734.

*To all whom it may concern:*

Be it known that I, NORMAN HILBERRY, a citizen of the United States, residing at Steubenville, in the county of Jefferson and State of Ohio, have invented certain new and useful Improvements in a Method of and Apparatus for Electric Welding, of which the following is a full, clear, concise, and exact description.

This invention relates to a method of and apparatus for electric welding and more particularly to welding of metallic parts wherein the parts are caused to engage while in a vaporized condition.

In welding electrical conductors, especially those of small size and which are insulated it is especially desirable to provide a very simple portable means for producing a satisfactory weld in a very short period of time. In the case of insulated conductors it is also desirable that such a weld may be produced without removing the insulation from the conductors near the junction and to weld such conductors without disturbing the insulation.

The general object of the invention is to simplify and improve the welding of metallic bodies or parts.

Another object of the invention is to simplify the apparatus required to produce a satisfactory weld by electrical methods between metallic bodies or parts.

A still further object of the invention is to weld insulated electrical conductors without in any manner disturbing the insulation of the conductors.

In order to accomplish these objects the self induction of the circuit including portions of the conductors to be welded, is employed to produce a discharge when the conductors are separated for the purpose of vaporizing the surfaces of the separated conductors, and while these surfaces remain in a vaporized condition they are caused to percussively re-engage each other. In accomplishing this result, use is made of a plurality of spring propelled inter-controlled plungers which are set in motion by a common release means to first close the circuit through the engaged members; second, move one of the conductors from its original position a slight distance to draw an arc caused by the collapse of the electro-magnetic field of the circuit; third, move the other conductor in the same direction and toward the first conductor until it percussively engages such conductor, and fourth, remove the source of current from the circuit.

These and other features will be fully comprehended from the following description and the accompanying drawings wherein, Figs. 1, 2 and 3 show a plan view, and side and end elevations respectively, of an apparatus arranged to produce welds in accordance with this invention.

Fig. 4 shows an enlarged end view of one of the clamping jaws for holding the end of the conductor to be welded, and Figs. 5 to 8 inclusive show in schematic form the various changes in the circuit employed in producing welds in accordance with this invention.

Referring to the drawings and more particularly to Figs. 1, 2, 3 and 4 a base plate 10 is provided upon which reciprocating plungers 11 to 14 inclusive are mounted by means of suitable bearings 15. These plungers are provided with spiral springs 17 to 20 inclusive which are compressed as shown in Fig. 1 when the apparatus is in preparation for producing a weld. The spring 17 is maintained between a collar 23 held in position by a pin 24 extending through the plunger 11 and the left hand bearing 15 for such plunger. Likewise springs 19 and 20 are maintained compressed, between similar collars 26 and 28 held in position by pins 25 and 27 in plungers 13 and 14 respectively. Co-operating with associated bearings 15 in a similar manner spring 18 extends between the right hand bearing 15 of plunger 12 and the member 30 which is fixedly secured to such plunger in any suitable manner. The member 30 is attached to the bottom portion 33 of the clamping device for one of the conductors and member 31 also attached to the portion 33, extends beyond such member on the opposite side of the conductor and is fixedly mounted upon and slidable with a rod 34 also attached to a base plate 10 by bearings 15. Adjacent the members 30 and 31 is a block 38 mounted upon the base 10 in a suitable manner and provided with a slot 39 in which one of the conductors to be welded may rest. The block 38 also serves as a stop for the members 30 and 31 as they are moved toward the left. The bottom portion 40 of the right hand clamping device is carried by a block 43 threadedly engaging the end of the plunger 13.

Opposite the tapered left end of the plunger 11 is a mounting 45 for electrical contact terminals 46 and 47 which are engaged and thereby electrically interconnected by the end of the plunger 11 when it travels toward the left. At the right of and in engagement with the tapered end of plunger 14 is a pair of electrical contact terminals 50 and 51 supported by a suitable mounting 52 upon the base plate 10. The plunger 11 is normally maintained in the position shown when the machine is in readiness for operation, by means of a bell crank lever 55 engaging a shoulder 56 near the right end of such plunger. Similarly the plungers 12 to 14 inclusive are maintained in the position shown by means of bell crank levers 57, 59 and 61 respectively engaging shoulders 58, 60 and 62 respectively of such plungers. Mounted upon the plunger 11 is a collar 65 adapted to engage the lower end of, and trip the bell crank lever 57 out of engagement with the shoulder 58 of the plunger 12 as the plunger 11 moves toward the left and a second collar 66 also carried by plunger 11 engages the lower end of and trips the bell crank lever 59 from its engagement with the shoulder 60 of the plunger 13 shortly thereafter. A collar 67 secured to the plunger 13 is arranged so that it will engage the lower end of the bell crank lever 61 and cause such lever to disengage the shoulder 62 of the plunger 14 shortly after the shoulder 60 of the plunger 13 is disengaged by the lever 59 and in response to the actuation of the lever 61 the plunger 14 moves toward the left and the tapered right hand end thereof disengages the terminals 50 and 51.

Each of the clamping jaws is provided with an upper spring compressed portion 41 maintained in position by adjustable springs 42 as shown more clearly in Fig. 4.

The terminal block 70 containing clamping contact members 71 and 72 is mounted upon the base plate 10 and provides simple means of attachment for the conductors such as 75 and 76 which are to be welded. A source of direct current 77 of any suitable nature, and rheostat 78 are provided to be included in a circuit with the conductors 75 and 76 in practicing the invention.

In the operation of the apparatus, the conductors 75 and 76 are engaged by the clamping element 71 and 72, the insulation being removed if necessary to provide electrical contact, and the free ends of such conductors are clamped in engagement with each other and by the insulated jaws as shown. Assuming that the rheostat 78 has been properly adjusted to provide a suitable current flow which will produce the requisite magnetic field in the close electrical circuit the operator pulls the trigger like bell crank lever 55 toward the left, thus causing it to disengage the plunger 11, the tapered left end of which engages the electrical terminals 46 and 47, thus completing the circuit including the conductors 75 and 76 but, due to the adjustment of the rheostat 78, the amount of current flowing through these conductors is not sufficient to produce any marked heating effect. Within a very short period of time after the engagement of the plunger 11 with the terminals 46 and 47, collar 65 operates bell crank lever 57 to release plunger 12. The plunger 12 in moving toward the left responds to the expansion of the spring 18, moves the left hand clamping jaw holding the conductor 75 toward the left with a quick movement until the member 30 engages the end of the block 38, thus separating the formerly contacting ends of the conductors 75 and 76. The movement of the left hand jaw in a definite line is insured by a member 31 which is connected to and movable with a reciprocating plunger 34 which moves freely in bearings 15. A very short interval afterward the collar 66 causes the crank 59 to release the plunger 13 whereupon such plunger moves rapidly toward the left carrying with it the block 43 and the right hand clamping jaws holding the end of the conductor 76. This movement continues until the end of the wire 76 is brought forcibly into engagement with the end of the conductor 75. Since in disengaging the ends of the conductors 75 and 76 the electro-magnetic field produced by the closed circuit collapses, and arc or discharge is produced between the separated conductors which although of very brief duration is of great intensity and vaporizes the formerly contacting surfaces to a slight depth so that when they are percussively engaged while still in the vaporized state the particles of the metal are caused to cohere in the same manner as within the body of the conductor itself. Immediately upon the re-engagement of the ends of the wires 75 and 76 collar 67 carried by the plunger 13 trips the lever 61 allowing the plunger 14 to move toward the left and disengaging the tapered end thereof from the terminals 50 and 51, thus re-opening the circuit including the source of current 77 and the rheostat 78.

The clamping jaws are then opened and the welded conductors removed therefrom as well as from the contact clamps 71 and 72 and the apparatus is reset in the condition shown ready for use in making another weld.

The sequence of operations is illustrated in schematic form in Figs. 5 to 8 inclusive from which it will be evident that the circuit is not closed until after the conductors are brought into engagement, immediately after such closure the wires are separated and are thereafter brought into re-engagement at which time or shortly thereafter the circuit is again opened.

It has been found that a method of this nature is particularly useful in welding small electrical conductors, especially where conductors of this sort are provided with insulation. In the latter case it is unnecessary to in any manner prepare the ends for welding and it is also unnecessary to remove the insulation from the wires in order to provide contact therewith since the distant ends of the wires can be attached to the clamps 71 and 72 and the current caused to traverse the entire length of each wire. In this manner the insulation, especially where enamel or other similar material is used, flows over and produces a properly insulated joint without further operation on the part of the operator.

Employing a method of this nature permits the use of a portable machine which may be controlled in a manner like that of a pistol or revolver, only requiring the operation of one lever on the part of the operator to set in motion the sequence of the positively controlled operations necessary.

By providing the compressed springs for controlling the movements of the various reciprocating plungers as well as the collars carried by the plungers it is evident that this apparatus may be adjusted to suit any condition which may arise and that a simple control is provided in each case. Furthermore, no elaborate or unwieldy apparatus is necessary in order to accomplish the proper welding of the wires as in case where welds have been produced by the use of condensers, transformers or other forms of electro-magnetic coils.

What is claimed is:

1. A method of electrically welding parts which comprise passing a constant current through contacting surfaces of the parts, moving one of the parts thereby disengaging the surfaces to produce an arc therebetween for vaporizing the surfaces and moving the other part to re-engage the surfaces while vaporized.

2. The method of electrically welding conductors, which comprises including the conductors directly in circuit with a source of constant current for causing a current flow through the contacting ends of the conductors and for maintaining an electromagnetic field produced solely by the current flowing through the conductors, separating the conductors to cause a collapse of the electromagnetic field and thereby to cause an inductive discharge between the separated conductors to vaporize the end surfaces thereof, and re-establishing the contact between the ends while vaporized.

3. The method of electrically welding conductors, which comprises connecting one end of one conductor with a source of constant current, contacting the other end of said conductor with one end of another conductor, connecting the other end of the second mentioned conductor with the other pole of the source of current, moving the second mentioned end of the first mentioned conductor away from its contacting engagement with the first mentioned end of the second mentioned conductor to produce an arc between the formerly contacting ends of the conductors, for vaporizing said ends of said conductors, forcing the first mentioned end of the second mentioned conductor into engagement with the second mentioned end of the first mentioned conductor while these ends are in vaporized condition, and disconnecting the source of current from the second mentioned end of the second mentioned conductor.

4. In an apparatus for electrically welding parts, a plurality of spring controlled reciprocating interlocking plungers which in response to the release of one plunger close the circuit through the parts to be welded, separate the parts, to draw an arc, forcibly re-engage the parts to produce a weld and reopen the circuit.

5. In an apparatus for electrically welding metallic parts, a pair of co-operating chucks for holding the parts in engagement, a source of constant current, circuit connections for including the engaged parts in circuit with the source and thereby causing a flow of constant current through the engaged parts, means for moving each of the chucks relative to each other to disengage the parts thereby forming an arc therebetween for vaporizing surfaces thereof, and to contact the vaporized surfaces thereby welding the parts.

6. In an apparatus for electrically welding metallic objects, circuit connections, a source of current included therein, spring actuated operating and timing means for associating the circuit connections with the objects while in engagement to pass a current from the source through the engaged objects, separating the objects for forming an arc to vaporize surfaces thereof, causing engagement of the vaporized surfaces to weld the objects and disassociating the circuit connections from the objects to prevent the further flow therethrough of current from the source and means for initiating the operation of the first mentioned means.

7. In an apparatus for electrically welding parts, means for holding the parts in contact, a plurality of interconnected and interdependent members adapted to operate in seriatim to close a circuit from a source of constant current through the parts to affect the holding means to disengage the parts to produce an arc therebetween for vaporizing surfaces thereof, to re-engage the parts while the surfaces are vaporized and to open the circuit, and means for starting the sequential operation of the members.

8. In an apparatus for electrically welding parts, means for holding the parts in contact, a plurality of interconnected and interdependent members adapted to close a circuit from a source of constant current through the parts, to affect the holding means to move one part thereby engaging the parts to produce an arc therebetween for vaporizing surfaces thereof, to move the other part thereby re-engaging the parts while the surfaces are vaporized, and to open the circuit, means for locking each of the members in an inoperative position, each of said locking means adapted to be unlocked by the operation of a previously operated member, and means for rendering the first mentioned member operative, thereby starting the sequential unlocking and operation of the other members.

9. In an apparatus for electrically welding parts, means for holding in contact the parts to be welded, a plunger having a spring associated therewith for moving it into engagement with contacting members to close a circuit through the parts in contact, a member normally maintaining the plunger in one position and for releasing it to render the spring thereof effective, means carried by the plunger for causing a second spring controlled plunger to move one of the parts away from the other, additional means carried by the first mentioned plunger for releasing a third spring controlled plunger for moving the other part in the same direction followed by the first mentioned part until the parts re-engage, and means controlled by the third plunger for releasing a fourth spring controlled plunger for reopening the circuit formerly closed by the first mentioned plunger.

In witness whereof, I hereunto subscribe my name this 20th day of February A. D., 1923.

NORMAN HILBERRY.